(12) United States Patent
Greene

(10) Patent No.: US 7,775,914 B1
(45) Date of Patent: Aug. 17, 2010

(54) BASEBALL SWING TRAINING DEVICE

(75) Inventor: Anthony J. Greene, Charlotte, NC (US)

(73) Assignee: QLB, LLC, Charlotte, NC (US)

( * ) Notice: Subject to any disclaimer, the term of this patent is extended or adjusted under 35 U.S.C. 154(b) by 138 days.

(21) Appl. No.: 12/070,245

(22) Filed: Feb. 15, 2008

(51) Int. Cl.
*A63D 69/00* (2006.01)
(52) U.S. Cl. .................. 473/452; 473/422; D21/753
(58) Field of Classification Search ............. 473/422, 473/452, 451, 270, 218, 272; D21/753
See application file for complete search history.

(56) References Cited

U.S. PATENT DOCUMENTS

| | | | |
|---|---|---|---|
| 3,815,906 A * | 6/1974 | Hermo ................. | 473/452 |
| 4,225,133 A * | 9/1980 | Kiray .................. | 473/457 |
| 4,257,608 A * | 3/1981 | Funk ................... | 473/272 |
| 4,322,084 A * | 3/1982 | Reece et al. .......... | 473/273 |
| 4,515,365 A   | 5/1985 | Horikoshi et al. ..... | 273/25  |
| 4,516,772 A * | 5/1985 | Stratton .............. | 473/452 |
| 4,583,733 A   | 4/1986 | Ito et al. ............ | 273/26 R |
| 4,664,375 A * | 5/1987 | Tetreault ............. | 473/429 |
| 5,083,789 A * | 1/1992 | Hickson ............... | 473/272 |
| 5,087,039 A   | 2/1992 | Laseke ................ | 273/26 R |
| 5,106,085 A * | 4/1992 | Lewy .................. | 473/417 |
| 5,226,645 A   | 7/1993 | Stewart ............... | 273/26 R |
| 5,246,234 A * | 9/1993 | Zambelli .............. | 473/272 |
| 5,259,610 A   | 11/1993 | Erb .................. | 273/72 R |
| 5,318,290 A   | 6/1994 | Sawyer ................ | 273/26 R |
| 5,435,727 A * | 7/1995 | Dobson ................ | 434/252 |
| D373,396 S    | 9/1996 | Malwitz ............... | D21/199 |
| 5,616,085 A * | 4/1997 | LaCoste et al. ........ | 473/267 |
| D399,280 S *  | 10/1998 | Griffin .............. | D21/753 |
| 6,059,668 A * | 5/2000 | Marley, Jr. .......... | 473/220 |
| 6,059,675 A   | 5/2000 | Finn .................. | 473/568 |
| 6,102,818 A   | 8/2000 | Hamilton .............. | 473/452 |
| 6,482,113 B1  | 11/2002 | Finn ................. | 473/551 |
| 6,579,195 B2  | 6/2003 | Lamb .................. | 473/417 |
| 6,773,366 B2  | 8/2004 | Gray .................. | 473/458 |
| 6,923,737 B1  | 8/2005 | Walker ................ | 473/457 |
| 6,926,625 B1  | 8/2005 | Fruechting ............ | 473/452 |
| D509,551 S    | 9/2005 | Reynolds .............. | D21/715 |
| 6,984,184 B2  | 1/2006 | Gray .................. | 473/458 |
| 7,090,599 B2  | 8/2006 | Hedgepath ............. | 473/452 |

(Continued)

OTHER PUBLICATIONS

Inventor's copending design application, Design U.S. Appl. No. 29/293,489, filed Nov. 28, 2007, for Baseball Swing Training Device.

*Primary Examiner*—Mitra Aryanpour
(74) *Attorney, Agent, or Firm*—Summa, Additon & Ashe, P.A.

(57) ABSTRACT

Baseball swing training apparatus having elongate base member and forward stop member, step member and connecting member extending laterally therefrom. Pivot stop member extends rearward from connecting member. Baseball swing training apparatus having elongate base member with forward member and rear member slidably engaged thereto. A forward stop member and a step member extend laterally from the forward member. A connecting member extends laterally from the elongate base member. A pivot stop member extends rearward from the connecting member. Means such as pins, holes, latches and the like secure the forward member in longitudinal position and the connecting member in transverse position. A method of teaching a batter to swing a bat including providing an apparatus having elongate base member and forward stop member, step member and connecting member extending laterally therefrom is also disclosed.

25 Claims, 14 Drawing Sheets

U.S. PATENT DOCUMENTS 7,131,916 B2    11/2006  Griffin .................. 473/417
7,294,071 B1    11/2007  Saumell ................ 473/451
2007/0243955 A1*  10/2007  Du Brock ............... 473/452

* cited by examiner

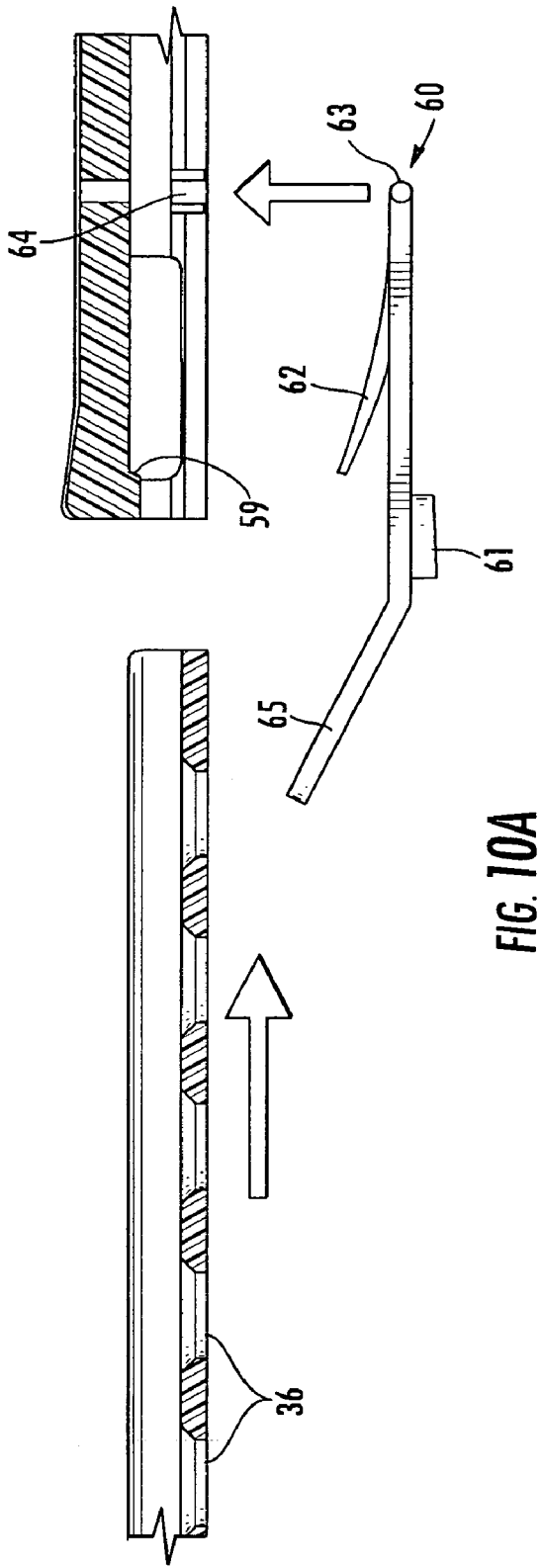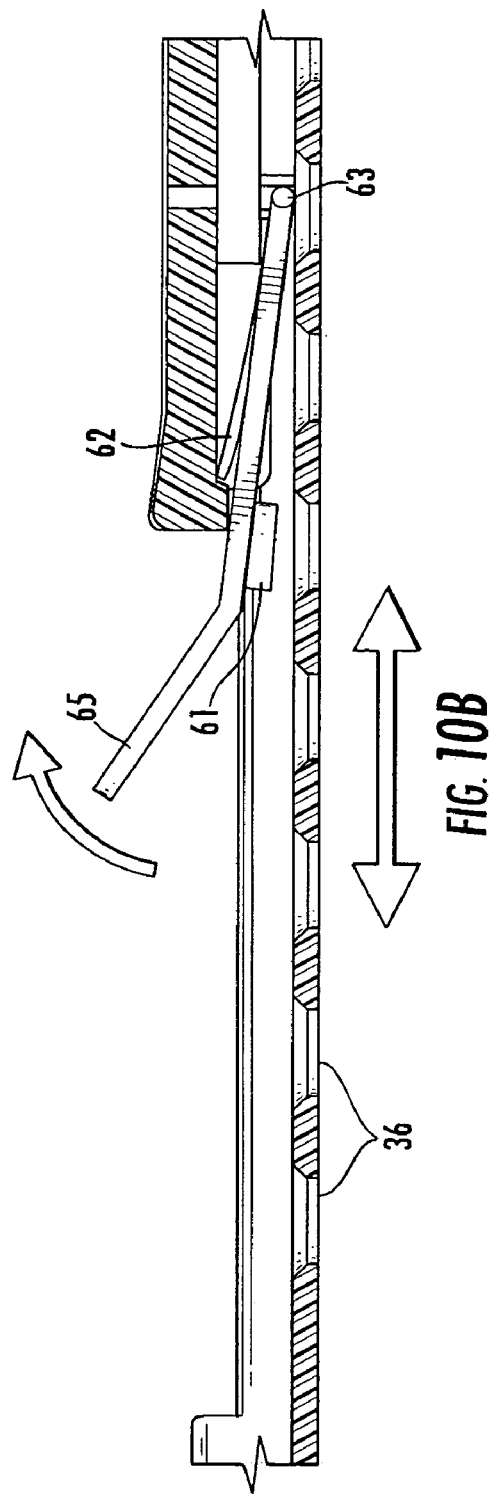

BASEBALL SWING TRAINING DEVICE

FIELD

1. Technical Field

The present invention relates to the field of athletic training devices and more particularly to a new apparatus for use in teaching the proper stance and lower body position for use in swinging a baseball or softball bat.

2. Background Information

There are many baseball and softball swing training aids on the market today. But many of these known baseball and softball swing training aids train a batter's upper body. For example, U.S. Pat. No. 6,773,366 discloses an apparatus for building muscle memory to develop a more rapid baseball swing. The apparatus disclosed in this patent includes an adjustable elastic tensioning member attached between a batter's lead arm just above the elbow and the batter's trailing forearm just above the wrist. While proper upper body swing mechanics are important to an effective baseball swing, balance and correct weight distribution throughout the swing are also required for maximum power and batting consistency. Because developing correct balance and weight distribution requires proper positioning and mechanics of both the upper body and the lower body throughout a batter's swing, known baseball swing training devices that focus exclusively on a batter's upper body do not completely train batters for a consistent and powerful swing.

Many baseball coaches believe that proper lower body swing mechanics require a proper forward step toward the ball, proper back and hip rotation, proper pivoting of the batter's back foot and distribution of the hitter's weight behind the ball. In this way, the baseball player can generate maximum power when hitting a ball.

It is known that baseball and softball players improve hitting ability through repetition and muscle memory. But known baseball swing training devices are often inadequate in providing feedback regarding proper lower body positioning that is required to develop proper lower body position muscle memory throughout a swing. What is needed in the art is a new baseball swing training device that correctly positions a batter's lower body throughout the swing. Ideally, such a new baseball swing training device would be portable, simple to use, capable of use by a sole batter and capable of use by young batters without the need for adult supervision.

SUMMARY

The present invention overcomes the disadvantages associated with known baseball swing training devices. In a preferred embodiment of the present invention a baseball swing training apparatus has an elongate base member with a forward end, a rearward end, an inward side and an outward side. A forward stop member extends laterally from the inward side of the elongate base member and, spaced rearward from the forward stop member, a step member also extends laterally from the inward side of the elongate base member. A forward foot area is thereby defined inward of the elongate base member between the forward stop member and the step member.

A connecting member also extends laterally from the inward side of the elongate base member between the step member and the rearward end of the elongate base member. A pivot stop member extends rearward from the connecting member and is laterally spaced from the inward side of the elongate base member. A rear foot area is thereby defined rearward of the connecting member between the pivot stop member and the inward side of the elongate base member.

A batter may learn a proper stance in which to swing a baseball bat by placing the apparatus on the ground, placing the batter's forward foot adjacent to and rearward of the step member, placing the batter's rear foot adjacent to and rearward of the connecting member and, during the batter's swing, stepping over the step member with the batter's forward foot to place the forward foot in the forward foot area defined between the forward stop member and the step member and simultaneously pivoting the ball of the batter's rear foot until the pivoting motion is stopped by the pivot stop member.

The step member and the connecting member may advantageously be substantially parallel and the elongate base member may advantageously be substantially parallel to the pivot stop member. The forward stop member may extend both laterally and forwardly from the inward side of the elongate base member. The height of at least a portion of the elongate base member rearward of the step member and the height of at least a portion of the elongate base member rearward of the connecting member may slope downward in the transverse direction from the outward side of the elongate base member to the inward side of the elongate base member. This slope aids batters in becoming accustomed to maintaining most of their weight on the forward part of their feet while preparing to swing a bat. The pivot stop member may slope upwardly in the rearward direction in order to better stop the pivoting motion of a batter's rear foot.

To accommodate batters of different ages and sizes, a preferred embodiment of the present invention provides a baseball swing training apparatus that is extendable in the longitudinal direction and in the lateral direction In this preferred embodiment, a baseball swing training apparatus has an elongate base member, a forward member and a rear member. The elongate base member has a forward end, a rearward end, an inward side and an outward side. The forward member slidably engages with the elongate base member and includes an elongate portion having a forward end, a rearward end, an inward side and an outward side; a forward stop member extending laterally from the inward side of the elongate portion; and a step member extending laterally from the inward side of the elongate portion and spaced rearward from the forward stop member. A forward foot area is thereby defined inward of the elongate portion of the forward member between the forward stop member and the step member.

A rear member slidably engages with the elongate base member between the forward end of the elongate base member and the rearward end of the elongate base member. The rear member includes connecting member extending laterally from the inward side of the elongate base member and a pivot stop member extending rearward from the connecting member and being laterally spiced from the inward side of the elongate base member. A rear foot area is thereby defined rearward of the connecting member between the pivot stop member and the inward side of the elongate base member.

In a preferred embodiment, the baseball swing training apparatus includes means for securing the forward member in a desired longitudinal position to the an elongate base member and means for securing the rear member in a desired lateral position to the an elongate base member. Such means may include a plurality of longitudinally spaced holes through the elongate portion of the forward member rearward of the step member; at least one hole through at least a portion of the forward end of the elongate base member positioned such that the plurality of longitudinally spaced holes in the elongate portion of the forward member pass into alignment with at least one hole through the portion of the elongate base member as the forward member slides longitudinally relative to the elongate base member; and a pin suitable for insertion through at least one hole in the portion of the elongate base member and through one hole of the plurality of holes in the elongate portion of the forward member.

Means for securing the forward member in a desired longitudinal position to the elongate base member may also include: a plurality of longitudinally spaced holes through at least a portion of the forward end of the elongate base member; a longitudinal channel in the forward member adapted and positioned for slidably receiving the portion of the forward end of the elongate base member having the plurality of holes therethrough; and a latch positioned in the longitudinal channel in the forward member such that the latch is not movable in the longitudinal direction when the forward end of the elongate base member is inserted into the longitudinal channel, the latch defining a pin movable between a first position in which the pin is within one hole of the plurality of longitudinally spaced holes through at least a portion of the forward end of the elongate base member thereby preventing longitudinal movement of the forward member relative to the elongate base member and a second position in which the pin is not within any hole of the plurality of longitudinally spaced holes through at least a portion of the forward end of the elongate base member thereby allowing longitudinal sliding movement of the forward member relative to the elongate base member.

Means for securing the rear member in a desired lateral position to the an elongate base member may include: a plurality of spaced holes through the connecting member; at least one hole through at least a portion of the elongate base member positioned such that the plurality of spaced holes in the connecting member pass into alignment with at least one hole through the portion of the elongate base member as the connecting member slides transversely relative to the elongate base member; and a pin suitable for insertion through at least one hole in the elongate base member and through at least one hole of the plurality of holes in the connecting member.

Means for securing the rear member in a desired lateral position to the an elongate base member may also include: a plurality of spaced holes through the connecting member; a transverse channel in the elongate base member adapted and positioned for slidably receiving the connecting member; and a latch positioned in the transverse channel in the elongate base member such that the latch is not movable in the transverse direction when the connecting member is inserted into the transverse channel, the latch defining a pin movable between a first position in which the pin is within one hole of the plurality of spaced holes through the connecting member thereby preventing lateral movement of the connecting member relative to the elongate base member and a second position in which the pin is not within any hole of the plurality of spaced holes through the connecting member thereby allowing lateral sliding movement of the connecting member relative to the elongate base member.

The present invention also includes a method of teaching a batter to swing a bat. An apparatus is provided having: an elongate base member with a forward end, a rearward end, an inward side and an outward side; a forward stop member extending laterally from the inward side of the elongate base member; a step member extending laterally from the inward side of the elongate base member and spaced rearward from the forward stop member to define a forward foot area inward of the elongate base member between the forward stop member and the step member; a connecting member extending laterally from the inward side of the elongate base member and spaced rearward from the step member and spaced forward from the rearward end of the elongate base member, and a pivot stop member extending rearward from the connecting member and being laterally spaced from the inward side of the elongate base member to define a rear foot area rearward of the connecting member between the pivot stop member and the inward side of the elongate base member. The heel of a batter's forward foot is positioned on the elongate base member adjacent to and rearward of the step member. The heel of the batter's rear foot is positioned on the elongate base member adjacent to and rearward of the connecting member. The batter is then instructed to swing the bat while stepping the batter's forward foot over the step member and placing the forward foot in the forward foot area and simultaneously pivoting on the ball of the rear foot until the pivoting motion is stopped by the pivot stop member.

BRIEF DESCRIPTION OF THE DRAWINGS

For a more complete understanding of the invention reference should now be had to the preferred embodiments illustrated in greater detail in the accompanying drawings and described below. In the drawings.

Figure 7:
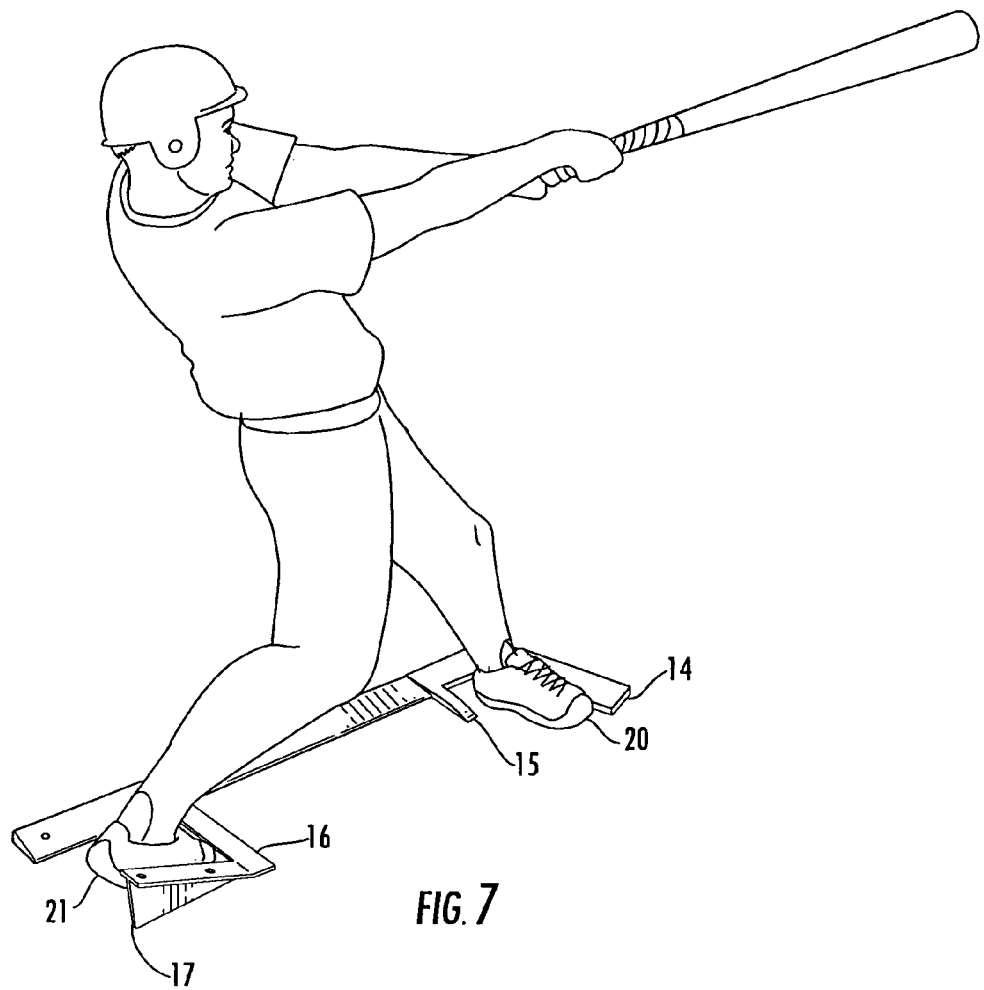
Figure 7A:
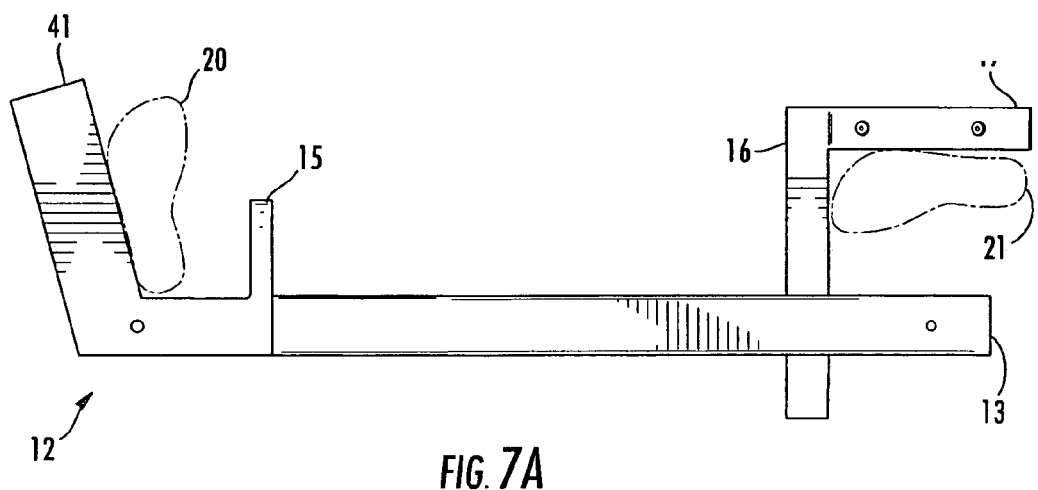
Figure 8:
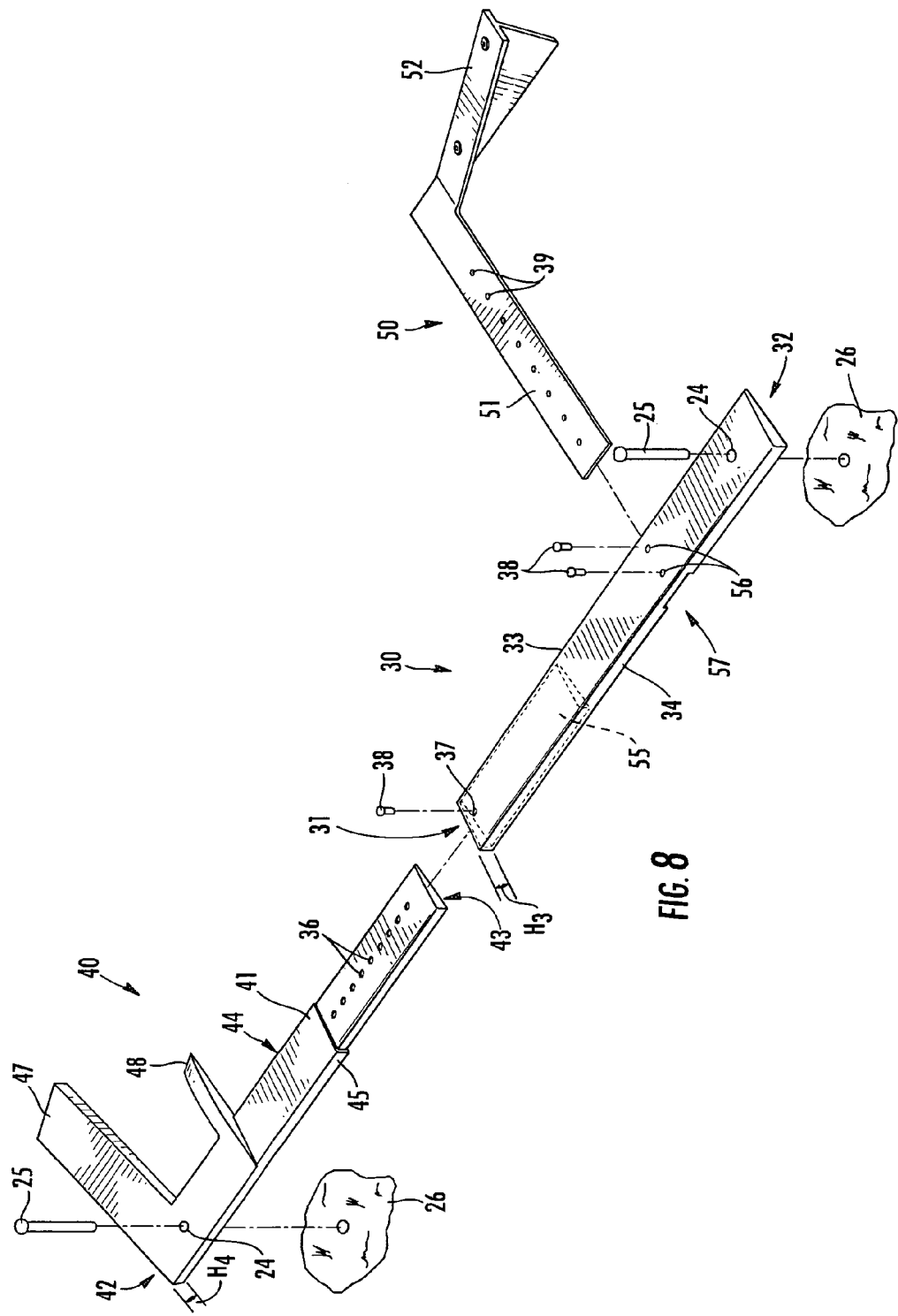
Figure 9:
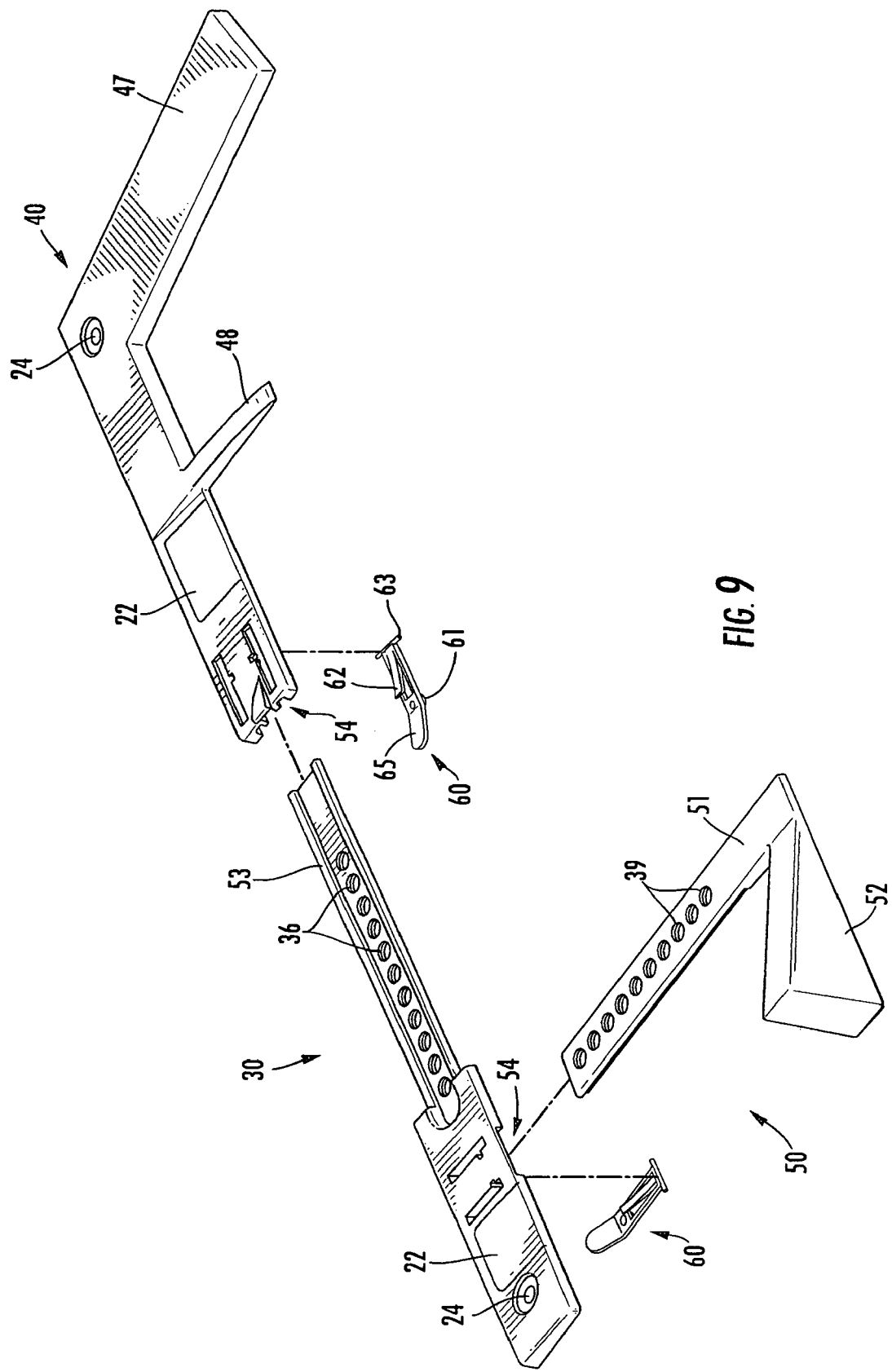
Figure 9A:
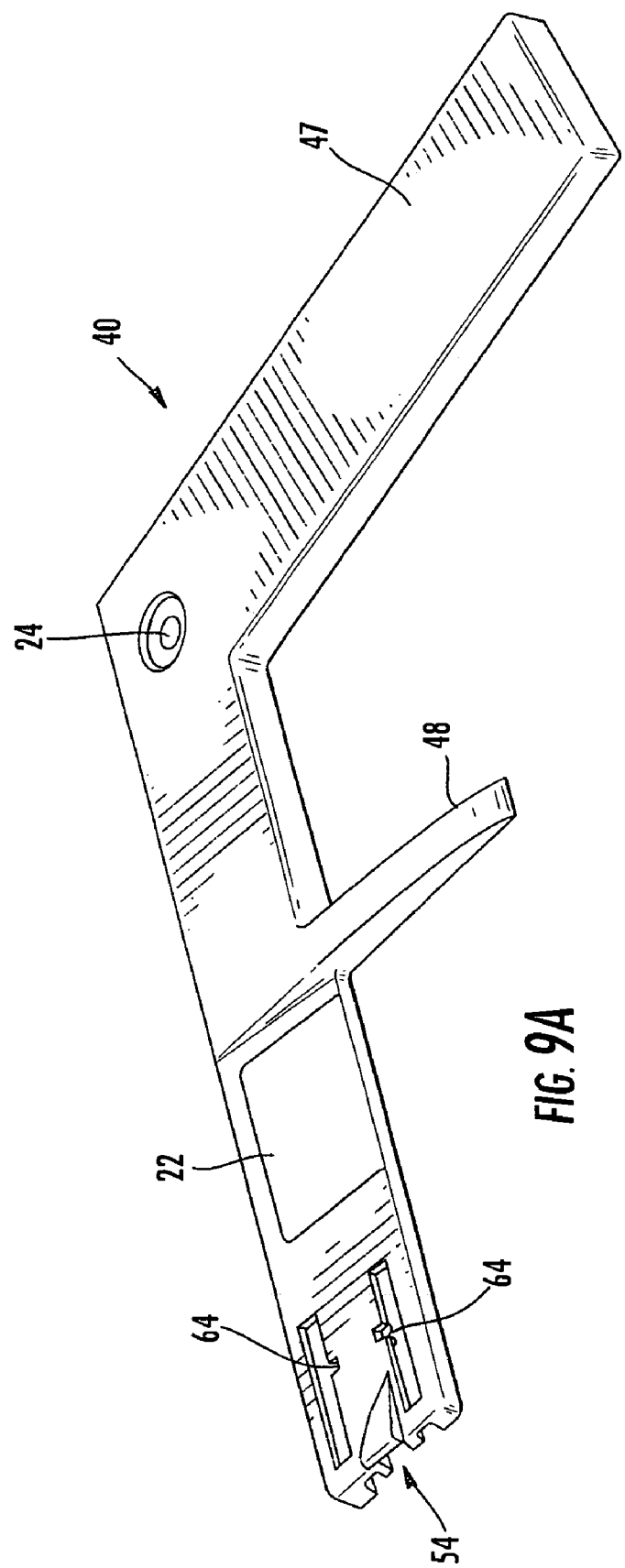
Figure 9B:
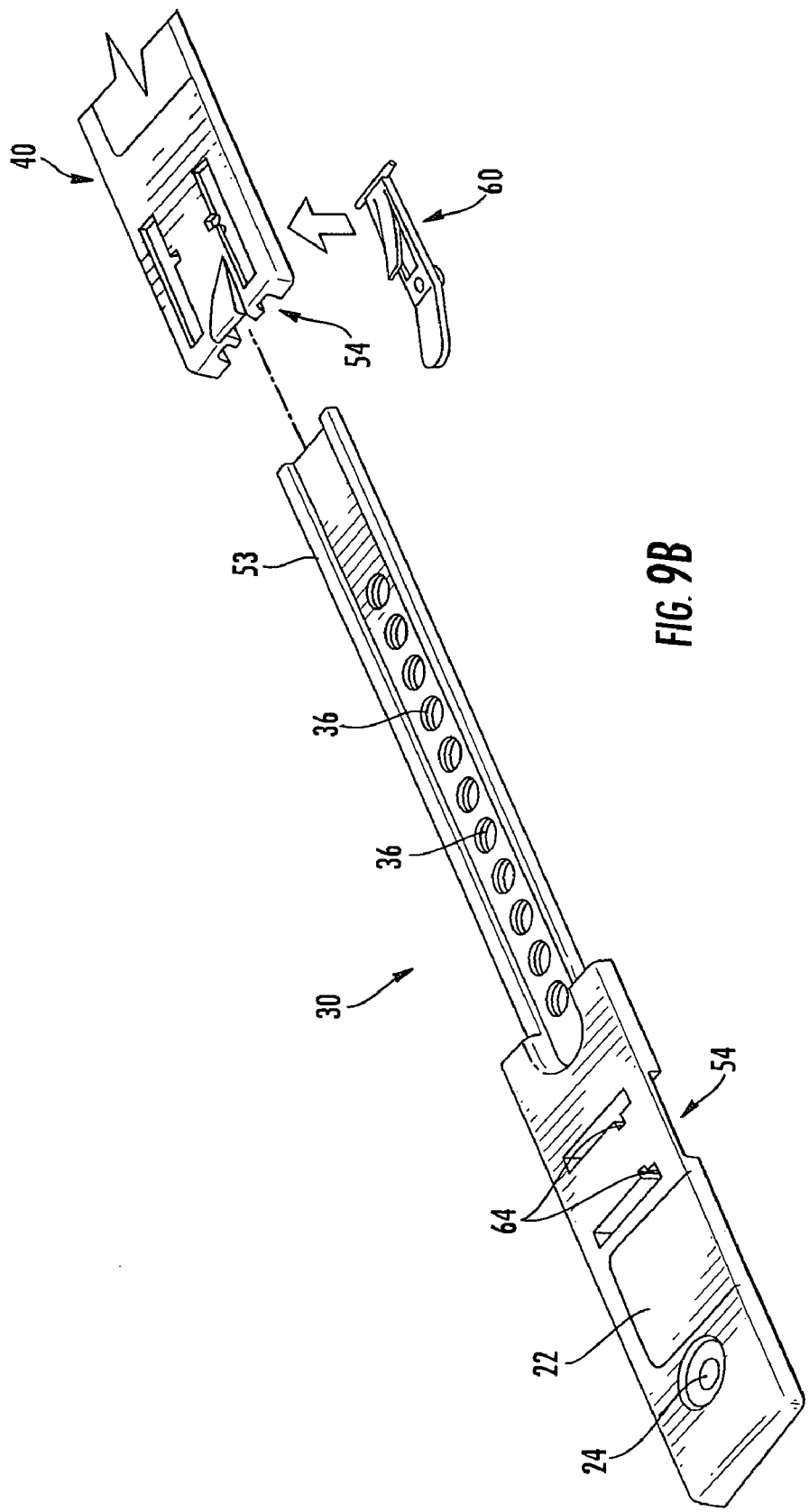
Figure 9C:
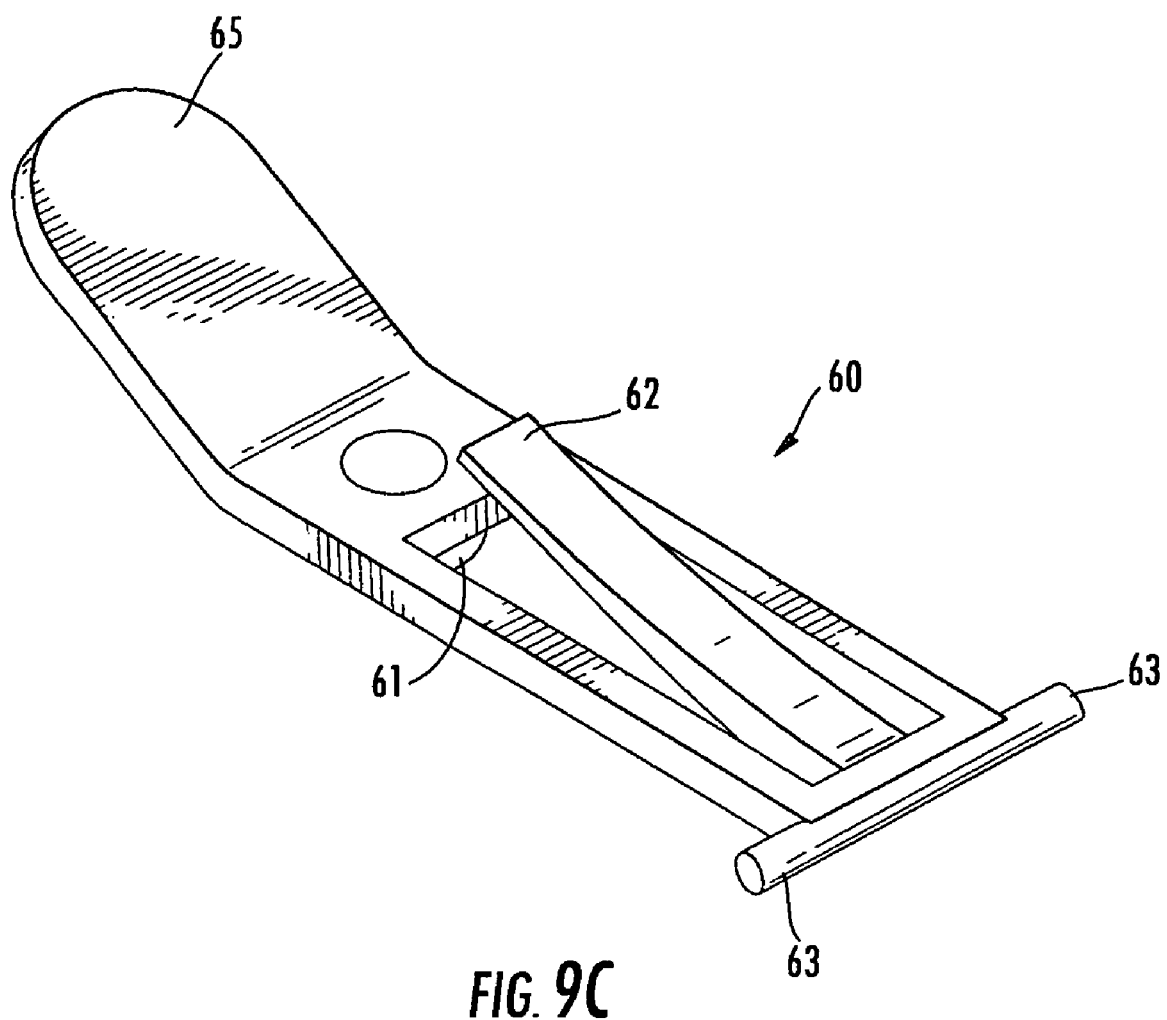
Figure 9D:
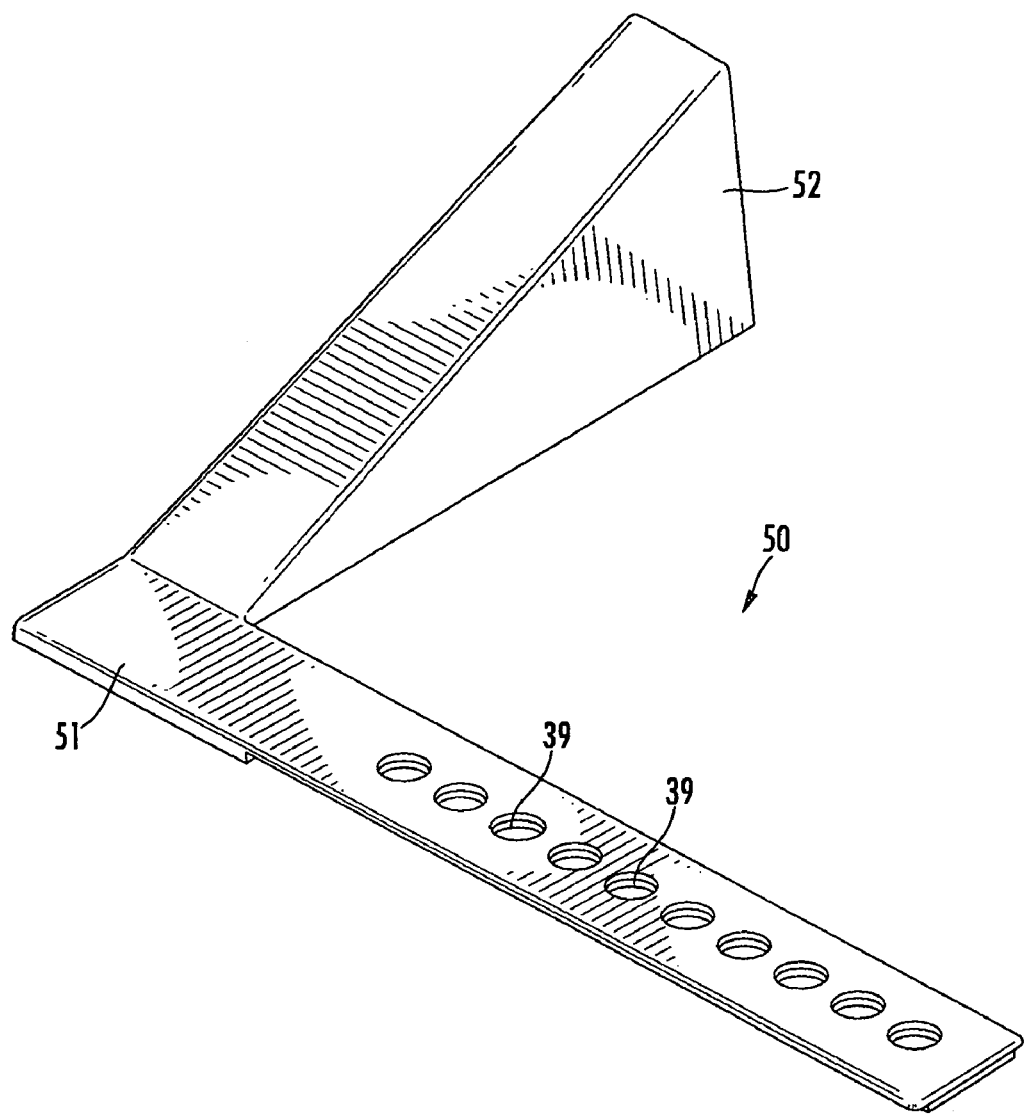
Figure 11:
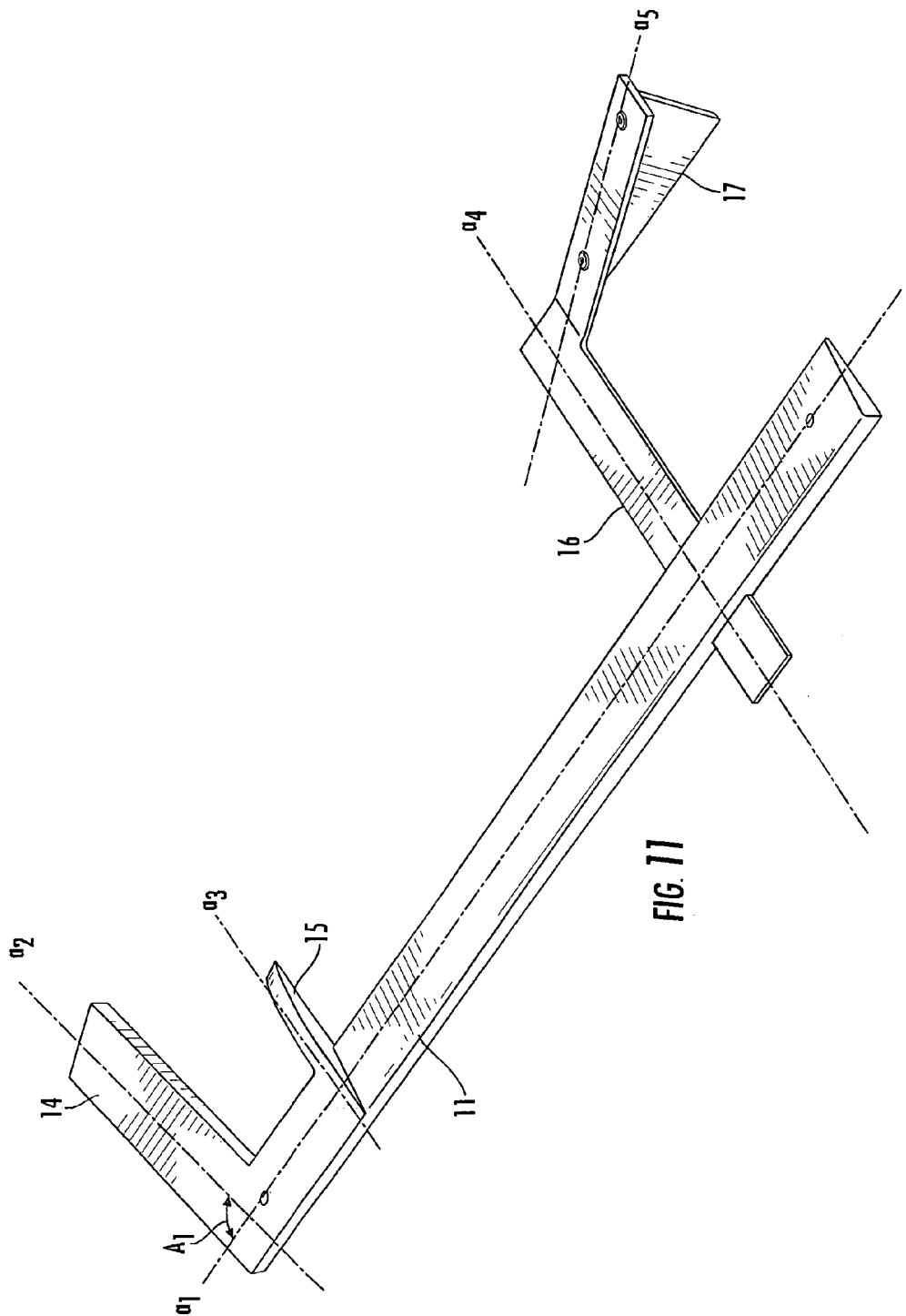

7 is a perspective view of the baseball swing training device and a batter positioned thereon at the end of the batter's swing;

FIG. 7A is a top plan view of the baseball swing training device and batter of FIG. 7 showing the batter's feet position in broken lines;

FIG. 8 is a perspective view of a baseball swing training device in accordance with a preferred embodiment of the present invention;

FIG. 9 is a perspective view of a baseball swing training device in accordance with a preferred embodiment of the present invention;

FIG. 9A is a perspective view of the forward member of the baseball swing training device of FIG. 9;

FIG. 9B is an exploded perspective view of the elongate base member, latch and portion of the forward member of the baseball swing training device of FIG. 9;

FIG. 9C is a perspective view of the latch of the baseball swing training device of FIG. 9;

FIG. 9D is a perspective view of the rear member of the baseball swing training device of FIG. 9;

FIGS. 10A and 10B are partial sectional views of the elongate base member, latch and portion of the forward member of the baseball swing training device of FIG. 9; and FIG. 11 is a perspective view of a baseball swing training device in accordance with a preferred embodiment of the present invention.

DESCRIPTION

The present invention will now be described fully hereinafter with reference to the accompanying drawings, which are not necessarily to scale, in which preferred embodiments of the invention are shown. This invention may, however, be embodied in many different forms and should not be construed as limited to the preferred embodiments set forth herein. Rather, these preferred embodiments are provided so that this disclosure will be thorough and complete, and will fully convey the scope of the invention to those skilled in the art. It will be understood that all alternatives, modifications, and equivalents are intended to be included within the spirit and scope of the invention as defined by the appended claims.

The present invention overcomes shortcomings associated with known baseball swing training devices by providing an apparatus that not only teaches a batter proper positioning of the batter's feet at the beginning of a swing but also provides a template for proper movement of the batter's feet throughout the swing. The present invention is simple, portable and capable of effective use by lone batters without the need for supervision or coaching. The baseball swing training device of the present invention may be used when hitting balls off of a tee or hitting balls pitched from a pitcher or pitching machine.

For simplicity, the present invention will be described hereinafter with respect to a baseball batter hitting a baseball. As will be appreciated by those in the art, the present swing training device may also be used for teaching proper swing mechanics for hitting a softball. Additionally, while the present invention is illustrated and described herein with respect to a right handed batter, the device of the present invention may easily be adapted for use by left handed batters by using a "mirror image" of the device.

With respect to terminology, as used herein "forward" refers to the direction from which a ball would be thrown to a batter by a pitcher and the terms "rearward" and "rear" refer to the opposite direction. Thus, for a right handed batter, the batter's left foot is the batter's "forward" foot and the batter's right foot is the batter's "rear" foot. Similarly, as used herein the word "inward" refers to the direction in which a batter's toes point, and the term "outward" refers to the opposite direction. Thus, the term inward generally refers to that side of a batter in which home plate would be located if the batter were standing in a batter's box.

Figure 1:
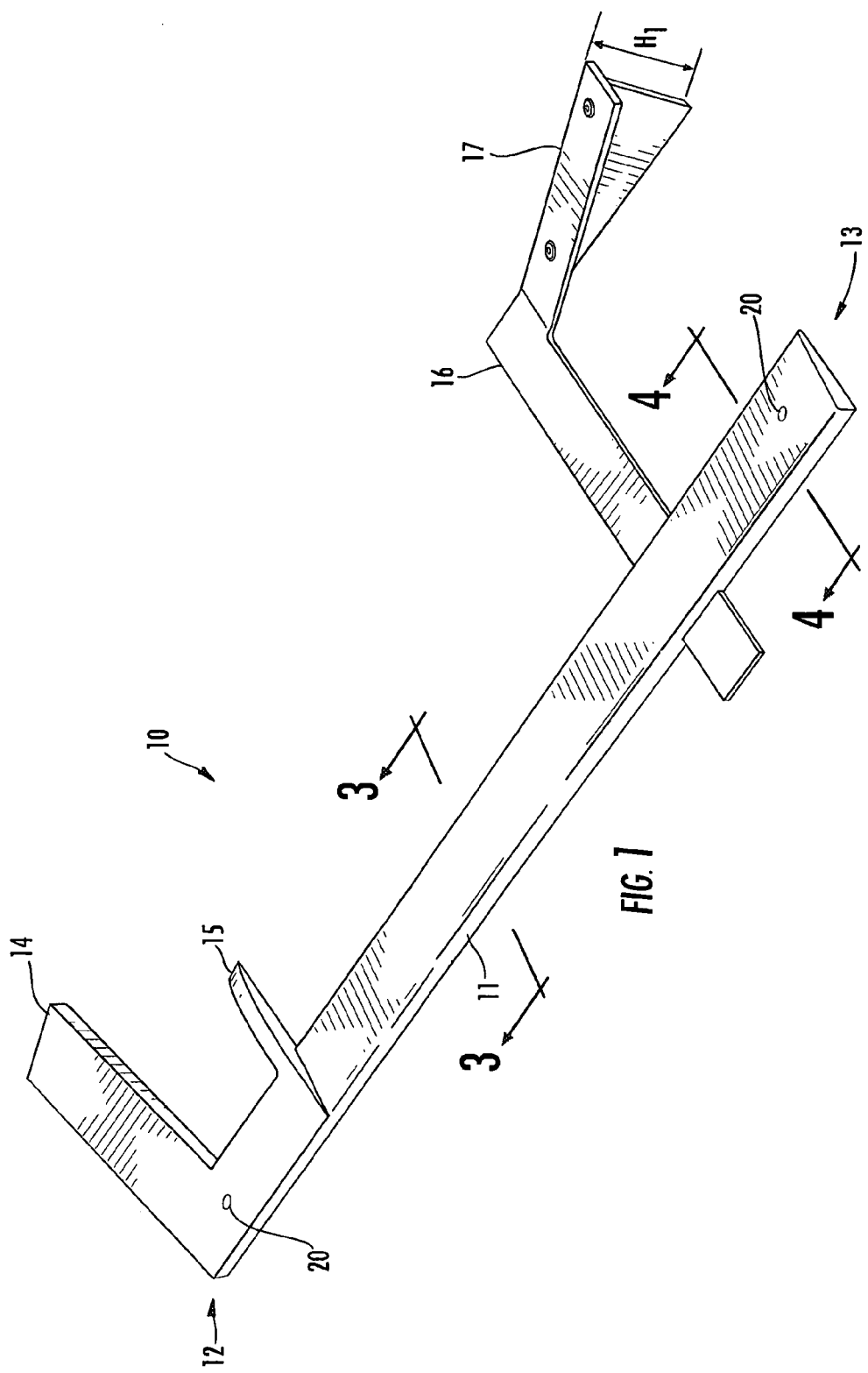
FIG. 1 is a perspective view of a baseball swing training device in accordance with a preferred embodiment of the present invention.

A preferred embodiment of a baseball swing training device according to the present invention is depicted in FIGS. 1-7. Turning initially to FIG. 1, a baseball swing training apparatus 10 includes an elongate base member 11 having a forward end 12 and rearward end 13. A forward stop member 14, step member 15 and connecting member 16 extend laterally from the inward side of the elongate base member 11. A pivot stop member 17 extends rearward from the connecting member 16. In a preferred embodiment, the height $H_1$ of the pivot stop member 17 is greatest at the rearmost end of the pivot stop member 17.

Figure 2:
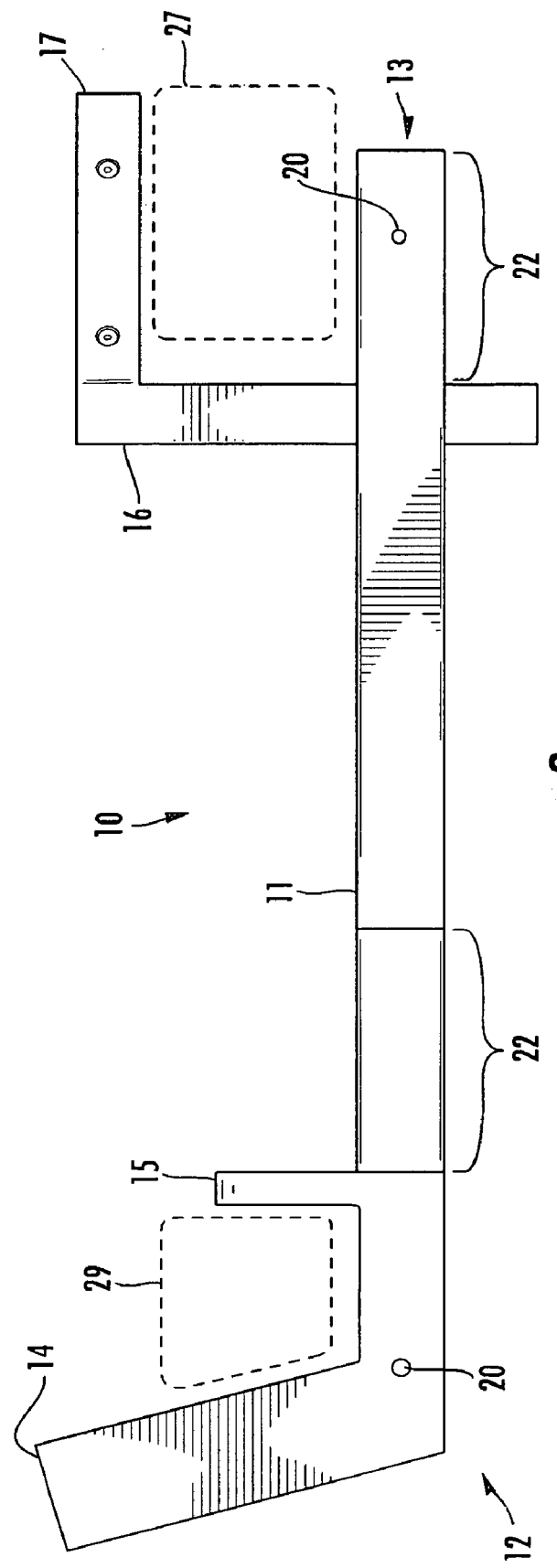
FIG. 2 is a top plan view of the baseball swing training device of FIG. 1.

As best illustrated in FIG. 2 and FIG. 11, in a preferred embodiment the elongate base member 11 is substantially straight and the step member 15 and connecting member 16 extend perpendicularly inward from the elongate base member 11 such that the longitudinal axis $a_3$ of the step member is substantially parallel to the longitudinal axis $a_4$ of the connecting member, and the pivot stop member 17 extends perpendicularly rearward from the connecting member 16 such that the longitudinal axis $a_5$ of the pivot stop member is substantially parallel to the longitudinal axis $a_1$ of the elongate base member 11. As illustrated in FIG. 2, a rear foot area 27 is thereby defined rearward of the connecting member 16 between the pivot stop member 17 and the inward side of the elongate base member 11 and a forward foot area 29 is thereby defined inward of the elongate base member 11 between the forward stop member 14 and the step member 15.

While the forward stop member 14 may extend perpendicularly inward from the elongate base member 11, as illustrated FIGS. 2 and 11 the forward stop member 14 may instead advantageously extend from the elongate base member both laterally inward and in a forward direction, to thereby create a forward angle $A_1$ of less than 90 degrees between the longitudinal axis $a_1$ of the elongate base member and the longitudinal axis $a_2$ of the forward stop member. It has been found that a forward angle $A_1$ between 30° and 90°, and preferably between 45° and 60°, may be advantageously used in the present invention.

Figure 3:
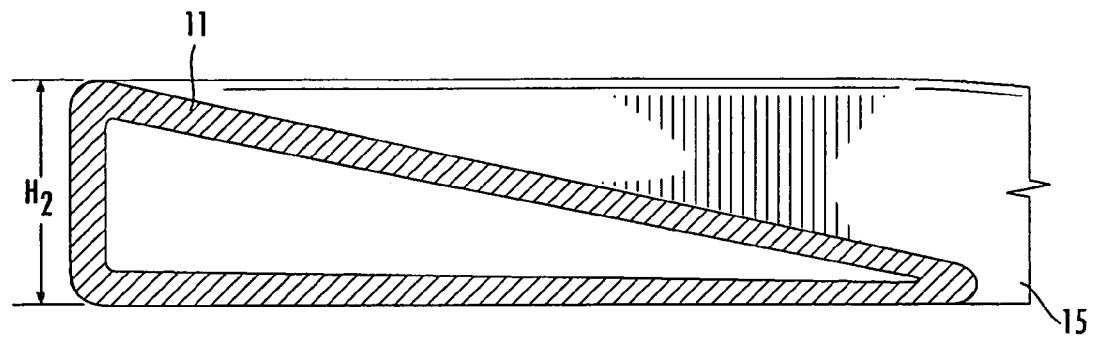
FIG. 3 is a partial section view of the baseball swing training device of FIG. 1 taken along the 3-3 line in FIG. 1.
Figure 4:
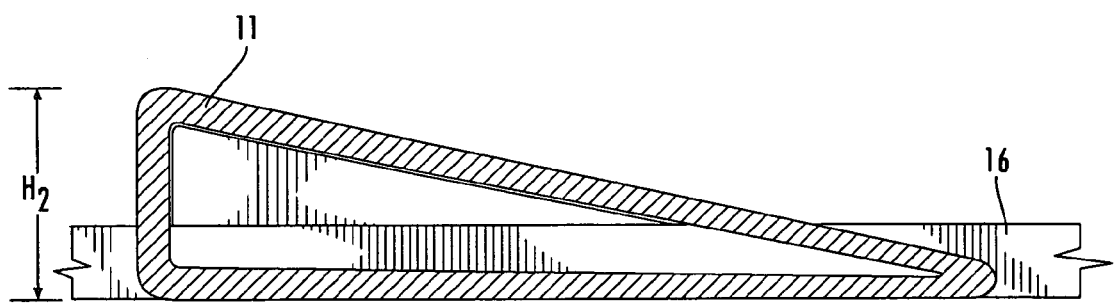
FIG. 4 is a partial section view of the baseball swing training device of FIG. 1 taken along the 4-4 line in FIG. 1.

While the elongate base member 11 may be of a uniform height, the height of the elongate base member 11 may instead slope from a maximum height $H_2$ at the outward side thereof to a minimum height at the inward side thereof, as illustrated in FIGS. 3 and 4. It has been found that a height of approximately one inch is suitable for use as the height of the elongate base member, although a height of 0.75 inch or a height of 0.5 inch may also advantageously be used for such height. In an embodiment in which the elongate base member has a height sloping downwardly from the outward side to the inward side thereof, it has been found that a slope from a maximum height $H_2$ of 0.75 inch at the outward side to a minimum height of approximately 0 inch at the inward side may be advantageously used.

Figure 5:
FIG. 5 is an elevation view of the outward side of the baseball swing training device.

The pivot stop member 17 may be of a uniform height. Advantageously, however, as illustrated in FIG. 5, the height of the pivot stop member 17 may increase from the point adjacent the connecting member 16 to a maximum height $H_1$ at the rearward end of the pivot stop member 17. A maximum height $H_1$ at the rearward end of the pivot stop member 17 of approximately 8 inches may and advantageously be used in the present invention, as may a maximum height $H_1$ at the rearward end of the pivot stop member 17 of approximately 6 inches.

Figure 6:
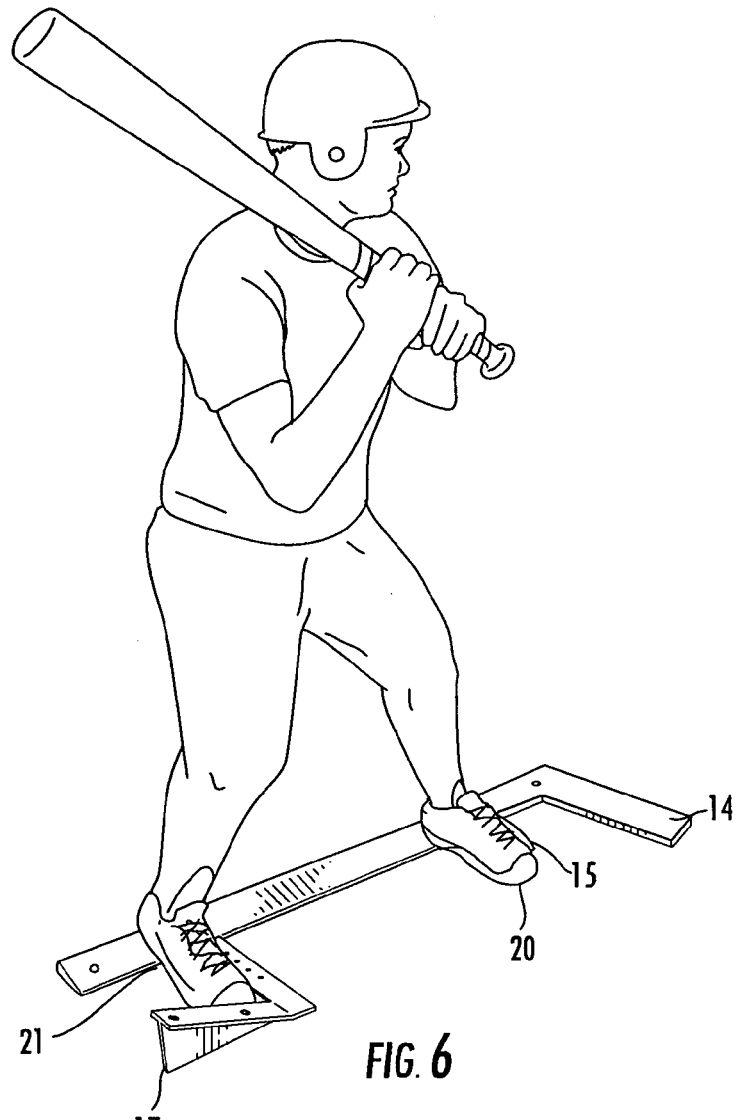
FIG. 6 is a perspective view of the baseball swing training device and a batter positioned thereon at the beginning of the batter's swing.
Figure 6A:
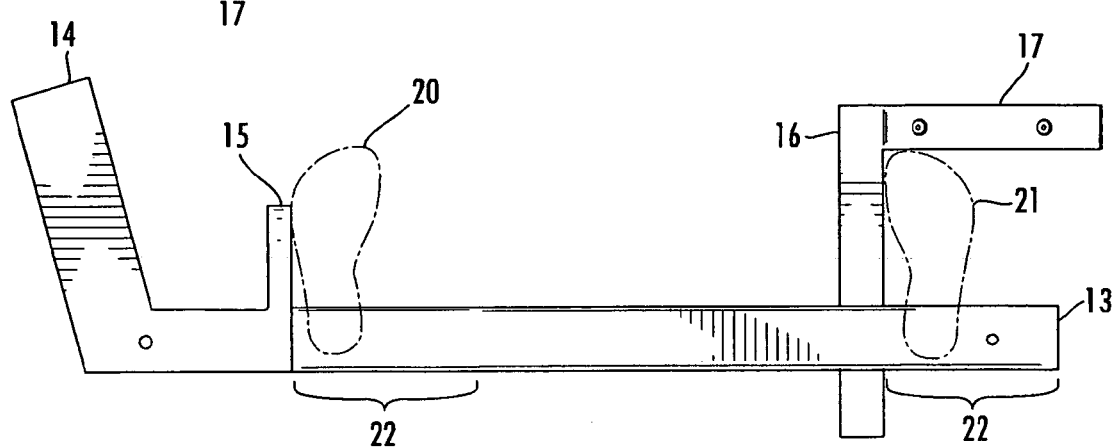
FIG. 6A is a top plan view of the baseball swing training device and batter of FIG. 6 showing the batter's feet position in broken lines.

FIGS. 6 and 7 illustrate use of the present invention by a right handed batter. The batter in FIG. 6 is illustrated in the "ready" position, or at the beginning of the swing motion. As illustrated in FIG. 6 and FIG. 6A, in this position the forward foot 20 of the batter is positioned rearward and adjacent to the step member 15 and the heal of the batter's forward foot 20 is positioned on the elongate base member 11, which advantageously may be sloped downwardly from outward to inward as described above. The batter's rear foot 21 is positioned rearward and adjacent to connecting member 16 and the heal of the batter's rear foot 21 is positioned on the elongate base member 11. The toe of the batter's rear foot rearward of the connecting member 16 and adjacent to the pivot stop member 17. If desired, non-skid materials or coatings may be placed on the surface of the elongate base member 11 in positions 22 on which a batter's heels will rest when in the ready position.

FIGS. 7 and 7A illustrates a batter at the end of the batter's swing motion. During the swinging motion the batter's forward foot 20 steps over the step member 15 and lands in the forward step area 29 adjacent to and rearward of the forward stop member 14 and, simultaneously, the batter's rear foot 21 pivots about the ball of the rear foot until the pivoting motion of the heal of the rear foot is stopped by the pivot stop member 17. Advantageously, as illustrated in FIG. 1, the height of the step member 15 may slope from a maximum height at the point adjacent the elongate base member 11 to a minimum height on the inward most portion of the step member 15.

A batter using the swing training device of the present invention thus learns correct lower body movement and positioning during the swing to thereby develop muscle memory. More specifically, in the starting position (illustrated in FIG. 6) the batter's heals are elevated so the batter gets accustomed to having the majority of his or her weight on the forward portions of the feet at the beginning of the swing movement. By stepping over step member 15 during the swing but stopping forward motion of the forward foot rearward of the stop member 14 the batter thereby learns to take a "soft" forward step—i.e., a small step in which the batter keeps the majority of his or her weight on the rear leg. Simultaneously, by pivoting the batter's rear foot until stopped by the stop member 17, the batter thereby learns to practice a pivot motion of approximately 90°. As illustrated in FIG. 7A, by using the baseball swing training device of the present apparatus, at the end of a batter's swing the batter's feet are properly positioned in line such that the rear foot is pointing generally through the ball of the forward foot toward the incoming baseball or softball.

Another preferred embodiment of the baseball swing training device of the present invention is illustrated in FIG. 8. This embodiment includes a forward member 40, an elongate base member 30 and a rear member 50. One or more holes 24 through the elongate base member 30 and/or the forward member 40 may be included such that a stake 25 can be inserted through the elongate base member 30 and/or forward member 40 and into the ground 26 to thereby secure the apparatus to the ground.

The embodiment depicted in FIG. 8 is particularly advantageous in that it is adjustable to accommodate hitters of different ages and hitters having different feet sizes and stance distances.

The elongate base member 30 has a forward end 31, a rearward end 32, an outward side 34, an inward side 33 and height $H_3$. Advantageously, the height $H_3$ of the elongate base member 30 may slope from a maximum height at the outward side 34 of the elongate base member 30 to a minimum height at the inward side 33 of the elongate base member. The elongate base member 30 includes an elongate channel 55 for receiving a portion of the forward member 40 to thereby make the overall length of the apparatus adjustable. The length between the forward end 31 of the elongate base member 30 and the rearward end 32 may be of any suitable length. It has been found that a length of 36 inches is suitable for use and a length of approximately 24 inches may also advantageously be used.

The forward member 40 includes an elongate portion 41 having a forward end of such elongate portion 42, a rearward end of such elongate portion 43, an outward side of such elongate portion 45, an inward side of such elongate portion 44 and a height $H_4$. A forward stop member 47 and a step member 48 extend laterally inwardly from the elongate portion 41 of the forward member 40. As previously discussed, the forward stop member 47 may extend perpendicularly from the elongate portion 41 or may extend in a forward direction. Similarly, and also as previously discussed, the step member 48 may be of a uniform height or may be sloped downwardly in the inward direction:

The elongate portion 41 of the forward member 40 may include one or more longitudinally spaced holes 36 positioned such that when the elongate portion 41 is slidably inserted into the longitudinal channel 55 in the elongate base member 30, the spaced holes 36 in the elongate portion sequentially come into alignment with a hole 37 through a portion of the elongate base member 30 and a pin 38 may be inserted through the hole 37 in the elongate base member and through one of the holes 36 in the elongate portion of the forward member 40 to thereby secure the forward member 40 in a longitudinal position relative to the elongate base member 30.

In a similar way, the connecting member 51 of the rear member 50 may include one or more spaced holes 39 and the elongate base member 30 may include a transverse channel 57 suitable for slidably receiving the connecting member 51. One or more holes 56 may be included in a portion of the elongate base member 30 in such a position that when the connecting member 51 is slidably received in the transverse channel 57 in the elongate base member 30 the spaced holes 39 in the connecting member 51 come in to sequential alignment with the holes 56 in the elongate base member such that one or more pins 38 may be inserted through one or more holes 56 in the elongate base member and through one or more holes 39 in the connecting member to thereby secure the rear member 50 in a lateral position relative to the elongate base member 30.

FIGS. 9 and 10 illustrate a preferred embodiment of the present invention that differs from the preferred embodiment illustrated in FIG. 8 primarily in that a latch 60 is used to adjustably connect the forward member 40 and the rear member 50 to the elongate base member 30 and that holes 36 used to adjustably connect the forward member 40 to the elongate base member 30 are holes through the elongate base member and not through the forward member.

Turning specifically to FIGS. 9 and 9A-9D, the elongate base member 30 in this preferred embodiment contains a plurality of longitudinally spaced holes 36 and a portion of the elongate base member 30 is shaped to be slidably received in a corresponding receiving channel 54 in the forward member 40. Similarly, the connecting member 51 has a plurality of spaced holes 39 and is shaped to be slidably received in a corresponding receiving channel 54 in the elongate base member 30. A latch 60 (see FIG. 9C) includes a spring element 62, one or more protrusions 63 and a tab 65. The latch 60 also includes a pin 61 for engaging holes 36, 39 in the forward member 40 and in the connecting member 51.

The elongate base member 30 is adjustably connected to the forward member 40 by positioning the latch 60 in the receiving channel 54 such that the protrusions 63 are positioned within corresponding indentions 64 in the receiving channel 54 and the spring element 62 engages shoulders 59 in the receiving channel 54, at which point the latch prevented from sliding out of the receiving channel and the latch pin 61 is biased downwardly for engagement into holes thereunder. The portion 53 of the elongate base member 30 shaped for insertion into the receiving channel 54 is then inserted into the receiving channel 40 to thereby slidably connect the elongate base member 30 to the forward member 40. The connecting member 51 may be slidably connected to the elongate base member 30 in a similar manner.

Engagement of the latch in a receiving channel is illustrated in FIGS. 10A and 10B. When the latch is secured within a receiving channel, a tab 65 on the latch remains outside of the receiving channel. Pulling upward on the tab 65 overcomes the downward biasing force of the spring element 62, which biases the latch pin 61 into a hole, to thereby allow the connected member to slide relative to each other to a desired position.

The forward member may be adjusted in the longitudinal direction relative to the elongate base member by pulling upward on the tab 65 of the latch 60 in the longitudinal receiving channel, sliding the forward member to a desired longitudinal position, and then releasing the tab 65, whereafter the latch pin 61 is then biased into a hole underneath. Similarly, the rear member may be adjusted in the lateral direction relative to the elongate base member by pulling upward on the tab 65 of the latch 60 in the transverse receiving channel, sliding the rear member to a desired lateral position, and then releasing the tab 65, whereafter the latch pin 61 is then biased into a hole underneath.

The present invention has been illustrated and described using a combination of pins or latches and holes to secure the forward member longitudinally and to secure the rear member laterally relative to the elongate base member. Many other mechanisms, including but not limited to, clamps, clasps, latches, hooks and frictional engagement of the various members may also be used in the present invention to secure the forward member longitudinally and to secure the rear member laterally relative to the elongate base member.

The apparatus of the present invention may be constructed of any suitable materials, including plastic, wood, metal, and concrete. Ten percent talc filled plastic and aluminum are particularly advantageous materials from which to construct the apparatus of the present invention.

It will be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A baseball swing training apparatus for instructing a batter to swing a bat to hit a ball, comprising:
   an elongate base member adapted for the batter to stand thereon, said elongate base member having a forward end, a rearward end, an inward side, and an outward side; wherein said elongate base member slopes downward at an angle from the outward side of said elongate base member to the inward side of said elongate base member such that said elongate base member elevates heels of a batter standing on said elongate base member;
   a forward stop member extending laterally from the inward side of said elongate base member;
   a step member extending substantially perpendicularly from the inward side of said elongate base member, said step member positioned between said rearward end of said base member and said forward stop member to define a forward foot area;
   a connecting member extending substantially parallel to said step member from the inward side of said elongate base member, said connecting member positioned between said rearward end of said base member and said step member; and
   a pivot stop member extending from an end of said connecting member opposite said elongate base member and substantially parallel to said elongate base member, said pivot stop member extending toward said rearward end of said elongate base member to define a rear foot area between the rearward end of said elongate base member, said connecting member, and said pivot stop member.

2. A baseball swing training apparatus as defined in claim 1 wherein an angle between a longitudinal axis of said elongate base member and a longitudinal axis of said forward stop member is between 30 degrees and 89 degrees.

3. A baseball swing training apparatus as defined in claim 1 wherein a portion of said elongate base member between said rearward end of said elongate base member and said step member slopes downward from the outward side of said elongate base member to the inward side of said elongate base member such that said elongate base member is adapted to elevate heels of a batter standing on said elongate base member.

4. A baseball swing training apparatus as defined in claim 1 wherein a height of at least a portion of said pivot stop member is greater than a maximum height of said elongate base member.

5. A baseball swing training apparatus as defined in claim 4 wherein said pivot stop member slopes upward from a first end immediately adjacent said connecting member to a second end of said pivot stop member.

6. A baseball swing training apparatus as defined in claim 1 wherein the height of said step member slopes downward in the transverse direction from said elongate base member to an opposite end of said step member.

7. A baseball swing training apparatus as defined in claim 1 wherein said elongate base member is extendable in the longitudinal direction between a first position in which said forward stop member and said step member are spaced from said connecting member to a second position in which said forward stop member and said step member are spaced farther from said connecting member.

8. A baseball swing training apparatus as defined in claim 7 wherein said connecting member is laterally extendable between a first position in which said pivot stop member is spaced from said elongate base member and a second position in which said pivot stop member is spaced farther from said elongate base member.

9. A baseball swing training apparatus as defined in claim 1 wherein said elongate base member defines at least one aperture there through and further comprising at least one stake suitable, when the apparatus is on the ground, for inserting through such aperture and into the ground beneath the apparatus to thereby secure the apparatus to the ground.

10. A baseball swing training apparatus for instructing a batter to swing a bat to hit a ball comprising:
    an elongate base member adapted for the batter to stand thereon, said elongate base member having a forward end, a rearward end, an inward side, and an outward side; wherein a portion of said elongate base member between said rearward end of said elongate base member and said step member slopes downward from the outward side of said elongate base member to the inward side of said elongate base member such that said elongate base member is adapted to elevate heels of a batter standing on said elongate base member;
    a forward member slidably engaged in the longitudinal direction with the forward end of said elongate base member, said forward member comprising an elongate portion having a forward end, a rearward end, an inward side, an outward side, a height and a longitudinal axis;

a forward stop member extending laterally at an angle from the inward side of the forward end of the elongate portion; and a step member extending substantially perpendicularly from the inward side of the elongate portion and spaced rearward from the forward stop member to define a forward foot area inward of the elongate portion of said forward member between the forward stop member and the step member; and a rear member slidably engaged in the transverse direction with said elongate base member at a position between the forward end of said elongate base member and the rearward end of said elongate base member, said rear member comprising a connecting member extending substantially parallel to said step member from the inward side of said elongate base member, said connecting member positioned between said rearward end of said base member and said step member, and a pivot stop member extending from an end of said connecting member opposite said elongate base member and substantially parallel to said elongate base member, said pivot stop member extending toward said rearward end of said elongate base member to define a rear foot area.

11. A baseball swing training apparatus as defined in claim 10 further comprising means for securing said forward member in a desired longitudinal position to said elongate base member and means for securing said rear member in a desired lateral position to said an elongate base member.

12. A baseball swing training apparatus as defined in claim 11 wherein said means for securing said forward member in a desired longitudinal position to said elongate base member comprise:

a plurality of longitudinally spaced holes through the elongate portion of said forward member rearward of the step member;

at least one hole through at least a portion of the forward end of said elongate base member positioned such that the plurality of longitudinally spaced holes in the elongate portion of said forward member pass into alignment with at least one hole through the portion of said elongate base member as said forward member slides longitudinally relative to said elongate base member; and a pin suitable for insertion through at least one hole in the portion of said elongate base member and through one hole of the plurality of holes in the elongate portion of said forward member.

13. A baseball swing training apparatus as defined in claim 12 wherein said means for securing said rear member in a desired lateral position to said elongate base member comprise:

a plurality of spaced holes through the connecting member;

at least one hole through at least a portion of said elongate base member positioned such that the plurality of spaced holes in the connecting member pass into alignment with at least one hole through the portion of said elongate base member as the connecting member slides transversely relative to said elongate base member; and a pin suitable for insertion through at least one hole in said elongate base member and through at least one hole of the plurality of holes in the connecting member.

14. A baseball swing training apparatus as defined in claim 11 wherein said means for securing said forward member in a desired longitudinal position to said elongate base member comprise:

a plurality of longitudinally spaced holes through at least a portion of the forward end of said elongate base member;

a longitudinal channel in said forward member adapted and positioned for slidably receiving the portion of the forward end of said elongate base member having the plurality of holes therethrough; and a latch positioned in the longitudinal channel in said forward member such that the latch is not movable in the longitudinal direction when the forward end of said elongate base member is inserted into the longitudinal channel, said latch defining a pin movable between a first position in which the pin is within one hole of the plurality of longitudinally spaced holes through at least a portion of the forward end of said elongate base member thereby preventing longitudinal movement of said forward member relative to said elongate base member and a second position in which the pin is not within any hole of the plurality of longitudinally spaced holes through at least a portion of the forward end of said elongate base member thereby allowing longitudinal sliding movement of said forward member relative to said elongate base member.

15. A baseball swing training apparatus as defined in claim 14 wherein said means for securing said rear member in a desired lateral position to said an elongate base member comprise:

a plurality of spaced holes through the connecting member;

a transverse channel in said elongate base member adapted and positioned for slidably receiving the connecting member; and a latch positioned in the transverse channel in said elongate base member such that the latch is not movable in the transverse direction when the connecting member is inserted into the transverse channel, said latch defining a pin movable between a first position in which the pin is within one hole of the plurality of spaced holes through the connecting member thereby preventing lateral movement of the connecting member relative to said elongate base member and a second position in which the pin is not within any hole of the plurality of spaced holes through the connecting member thereby allowing lateral sliding movement of the connecting member relative to said elongate base member.

16. A baseball swing training apparatus as defined in claim 15 wherein the forward-most angle between the longitudinal axis of the elongate portion of said forward member and the longitudinal axis of the forward stop member is between 30 degrees and 89 degrees.

17. A baseball swing training apparatus as defined in claim 15 wherein a height of at least a portion of said pivot stop member is greater than a maximum height of said elongate base member.

18. A baseball swing training apparatus as defined in claim 17 wherein the height of at least a portion of said pivot stop member is between 4 inches and 9 inches.

19. A baseball swing training apparatus as defined in claim 17 wherein the height of the pivot stop member slopes upward in the longitudinal direction from a first end attached to the connecting member to a second end of the pivot stop member.

20. A baseball swing training apparatus as defined in claim 15 wherein a height of the step member slopes downward in the transverse direction from the elongate portion of said forward member to an inner-most end of the step member.

21. A baseball swing training apparatus for instructing a batter to swing a bat to hit a ball, comprising:

an elongate base member for positioning directly onto the ground and under a batter's feet, said elongate base member having a forward end, a rearward end, an inward side, and an outward side; wherein said elongate base member slopes downward at an angle from the outward side of said elongate base member to the inward side of said elongate base member such that said elongate base member elevates heels of a batter standing on said elongate base member;

a step member extending substantially perpendicularly from the inward side of said elongate base member;

a connecting member extending substantially parallel to said step member from the inward side of said elongate base member said connecting member positioned between said rearward end of said elongate base member and said step member; and a pivot stop member extending from an end of said connecting member opposite said elongate base member and substantially parallel to said elongate base member, said pivot stop member extending toward said rearward end of said elongate base member to define a rear foot area between the rearward end of said elongate base member, said connecting member, and said pivot stop member.

22. A baseball swing training apparatus according to claim 21, wherein said elongate base member is so dimensioned such that a user stands with heels on said elongate base member to swing a bat at a ball.

23. A baseball swing training apparatus according to claim 21 wherein a portion of said elongate base member between said rearward end of said elongate base member and said step member slopes downward from the outward side of said elongate base member to the inward side of said elongate base member such that said elongate base member is adapted to elevate heels of a batter standing on said elongate base member.

24. A baseball swing training apparatus according to claim 21 further comprising a forward stop member extending laterally from the inward side of said elongate base member between said step member and said forward end of said elongate base member.

25. A baseball swing training apparatus according to claim 21 further comprising a rear member slidably engaged in the transverse direction with said elongate base member at a position between the forward end of said elongate base member and the rearward end of said elongate base member.

* * * * *